Sept. 24, 1957  G. P. JANKAUSKAS  2,807,338
ANTI-SKID BRAKING SYSTEM FOR AUTOMOTIVE VEHICLES
Filed Jan. 19, 1953  5 Sheets-Sheet 1

STATIC FORCE PLAN $QA_x = F + R$
FORCE OF INERTIA $= -QA_x$
$A_x$ = DECELERATION OF VEHICLE

DYNAMIC FORCE PLAN DURING BRAKING

REAR BRAKES PERFORMANCE DIAGRAM

INVENTOR:
G. P. Jankauskas
BY Richard Geier
ATTORNEYS

Sept. 24, 1957  G. P. JANKAUSKAS  2,807,338
ANTI-SKID BRAKING SYSTEM FOR AUTOMOTIVE VEHICLES
Filed Jan. 19, 1953  5 Sheets-Sheet 2

SPRING DEFLECTION
OIL PRESSURE

ADHESION
BREAKING FORCE

INVENTOR
G. P. JANKAUSKAS
BY

ATTORNEYS

Sept. 24, 1957  G. P. JANKAUSKAS  2,807,338
ANTI-SKID BRAKING SYSTEM FOR AUTOMOTIVE VEHICLES
Filed Jan. 19, 1953  5 Sheets-Sheet 3

INVENTOR
G. P. JANKAUSKAS
BY

ATTORNEYS

Sept. 24, 1957 G. P. JANKAUSKAS 2,807,338
ANTI-SKID BRAKING SYSTEM FOR AUTOMOTIVE VEHICLES
Filed Jan. 19, 1953 5 Sheets-Sheet 4

INVENTOR:
G. P. Jankauskas
BY
Richard Geier
ATTORNEYS

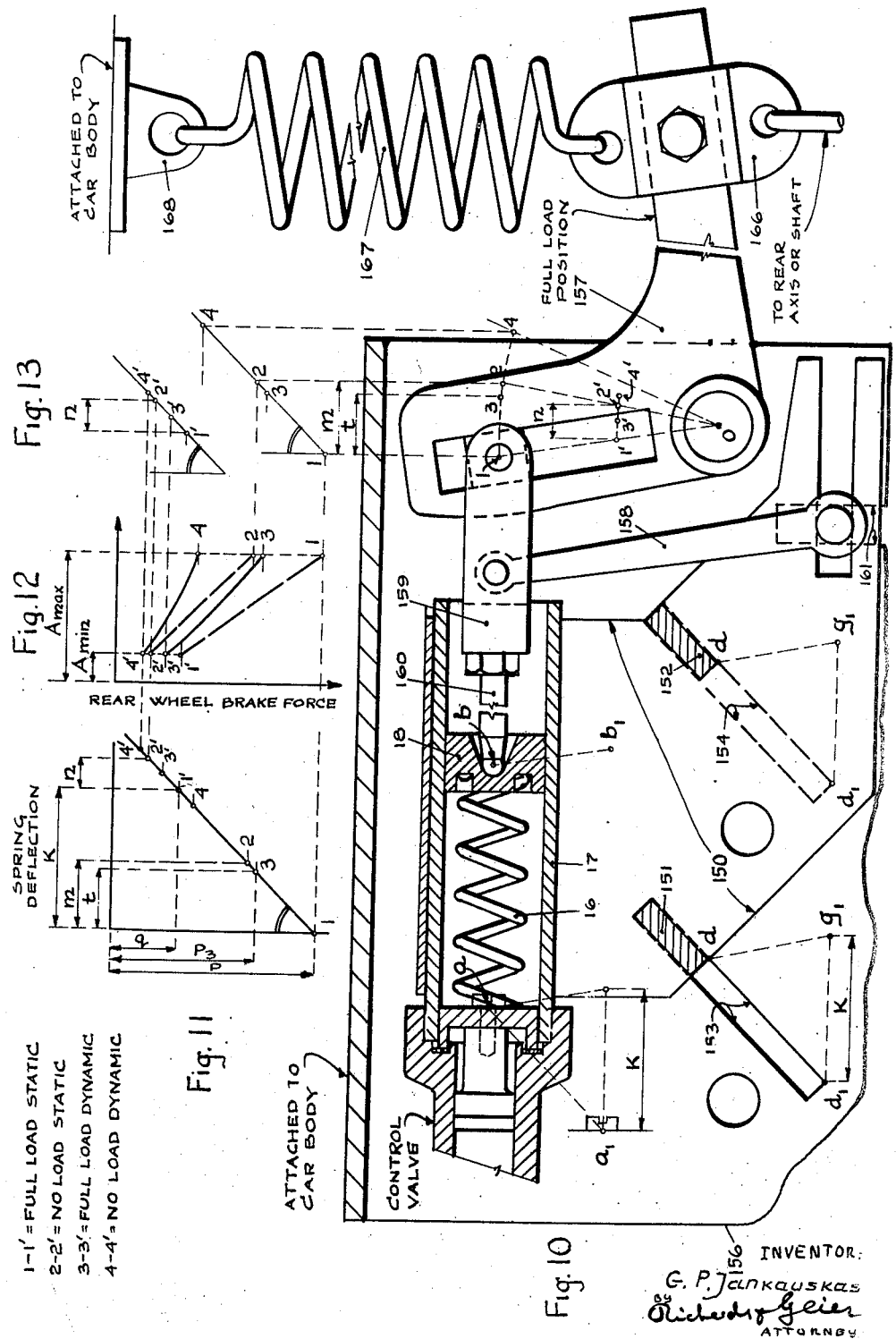

United States Patent Office 2,807,338
Patented Sept. 24, 1957

2,807,338

ANTI-SKID BRAKING SYSTEM FOR AUTOMOTIVE VEHICLES

George Platon Jankauskas, New York, N. Y., assignor to Walter A. Dubovick, Fords, and John P. Kozak and Paul A. Kozak, South River, N. J.

Application January 19, 1953, Serial No. 332,064

5 Claims. (Cl. 188—195)

This invention refers to anti-skid braking systems for automotive vehicles and refers more particularly to hydraulic braking systems for automotive vehicles wherein skidding is prevented by controlling rear wheel brakes.

An object of the present invention is the provision of simple and effective operating means preventing the locking of brakes in rear wheels.

Another object is the provision of anti-skid braking systems wherein rear wheel braking forces are related to the car load as well as to the adhesion between the tires and the road.

Other objects of the present invention will become apparent in the course of the following specification.

The object of the present invention may be realized through the provision of hydraulic braking systems which differ from prior art system through the insertion of a control valve in the hydraulic circuit.

In accordance with one embodiment of the inventive idea the anti-skid braking system constituting the subject matter of the present invention is operated manually so that all adjustments for load and road conditions are set by the driver.

In accordance with another embodiment the driver is required to make adjustments for road conditions only while load conditions are adjusted automatically.

The invention will appear more clearly from the following detailed description when taken in connection with accompanying drawings showing, by way of example only, preferred embodiments of the inventive idea.

In the drawings:

Figure 10 is a detailed partial view of Fig. 9 on an enlarged scale.

Figure 11 is a diagram illustrating spring deflection.

Figure 12 is a diagram illustrating the rear wheel brake force.

Figure 13 illustrates diagrammatically the shifting of a control lever.

The present invention is based essentially on the consideration that skidding is caused by excessive braking, namely by applying an excessive amount of pressure on the brake pedal, thereby causing locking of the brake shoe to the brake drum so that the rotation of the rear wheels is prevented. By "skidding" I mean a sliding of the wheels to either side of a desired straight line of travel during braking. I do not include either the sliding produced by centrifugal force during negotiation of a curve or straight-ahead sliding of locked wheels during braking. Skidding occurs because adhesion of the rear wheels decreases at the very moment when the rear wheels of the car are locked. At that moment the system becomes unbalanced since the inertia force exerted on the rear wheels becomes greater than the adhesion of the locked rear wheels. This excessive inertia force pulls the rear wheels ahead and consequently the car begins to skid. Since all braking systems operate on the basic principle of adhesion between the wheels and the road, it can be readily seen that an automotive vehicle will derive less braking force from the rear wheels when those wheels are locked since the sliding adhesion forces are smaller than the rolling adhesion forces.

Figure 1:
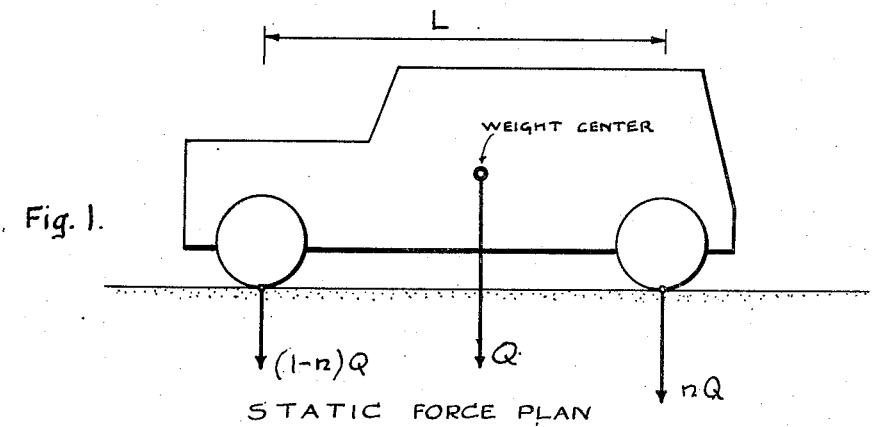
Figure 1 is a diagram illustrating the static force plan of an automobile.

Figure 1 illustrates an automobile wherein the distance between the front axles and rear axles is designated as L. The weight of the car Q may be represented as acting downwardly upon the weight center and may be separated into the force $nQ$ acting on the rear wheel and the force $(1-n)Q$ acting on the front wheel where $n$ is the percentage of the weight of the car acting on the rear wheels only.

Figure 2:
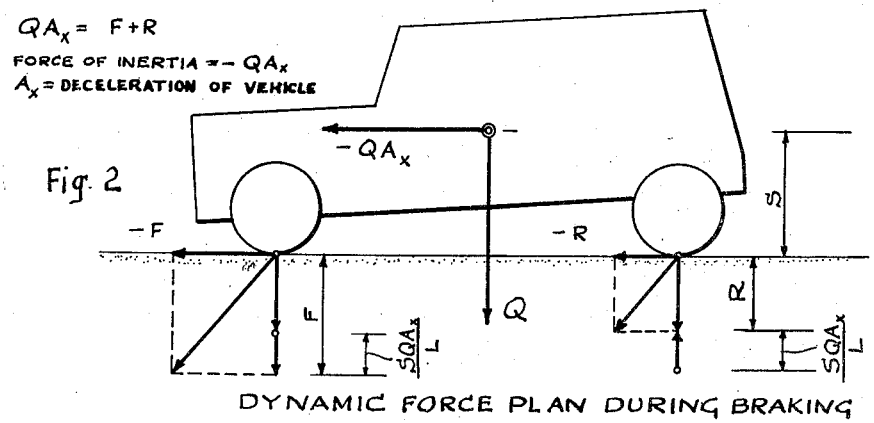
Figure 2 is a similiar diagram illustrating the dynamic force plan during braking.

When brakes are applied to an automotive vehicle the weight of the car concentrated at the center of gravity acts as an inertia force which extends horizontally. The force of deceleration may be represented as $-QA_x$ where-in $A_x$ represents the deceleration due to the friction force caused by the road and tire adhesion. Then $QA_x = F + R$ wherein F represents that part of the force which acts upon the front wheel and R the part acting on the rear wheel. It is apparent from the diagram of Figure 2 that during braking the inertia force causes the front wheels of the automotive vehicle to increase their pressure on the road while, conversely, the pressure of the rear wheels against the road is decreased by the same amount. Due to this decrease in pressure of the rear wheels against the road the brakes of the rear wheels lock first. As already mentioned, this early locking of the rear brakes causes the automotive vehicle to skid.

Figure 3:
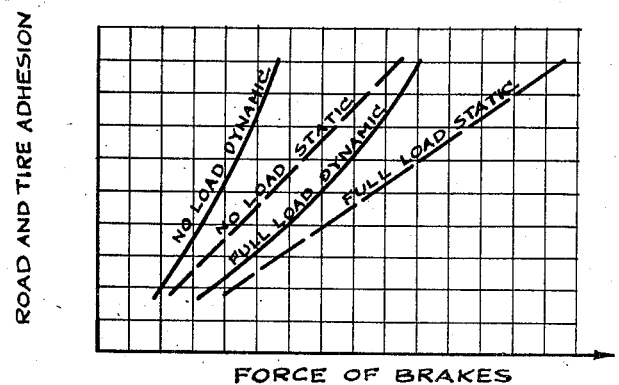
Figure 3 is a diagram of rear brakes performance.

Figure 3 illustrates a rear brakes performance diagram which shows firstly the brake force as a function of adhesion. For theoretical static conditions, this is represented by two straight lines. These two diagrams are for no load and for full load, respectively, and they may be represented by the formula $R_x = nQA_x$ where $R_x$ is the braking force exerted by the rear wheel.

Figure 3 also shows two curved lines representing dynamic conditions during braking for full load and no load conditions, respectively. These may be represented by the formula $$R_x = QA_x\left(n - \frac{S}{L}\right)$$

Figure 4:
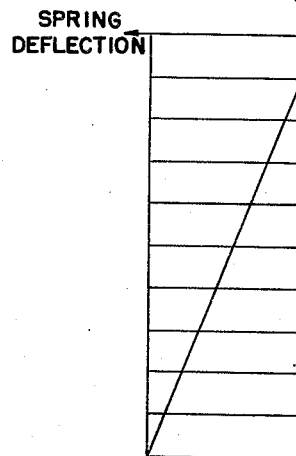
Figure 4 is a diagram illustrating control valve spring performance.
Figure 5:
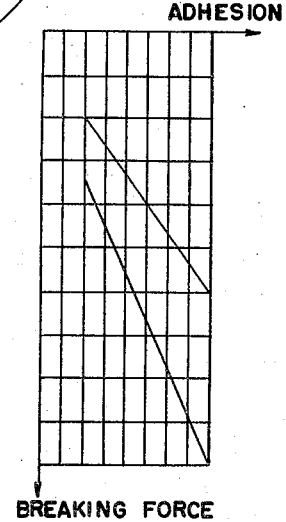
Figure 5 is a diagram illustrating the rear brakes performance.
Figure 8:
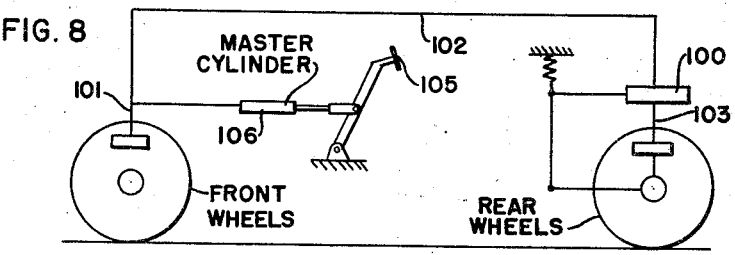
Figure 8 illustrates diagrammatically the hook-up of a modified control valve in a hydraulic circuit.
Figure 6:
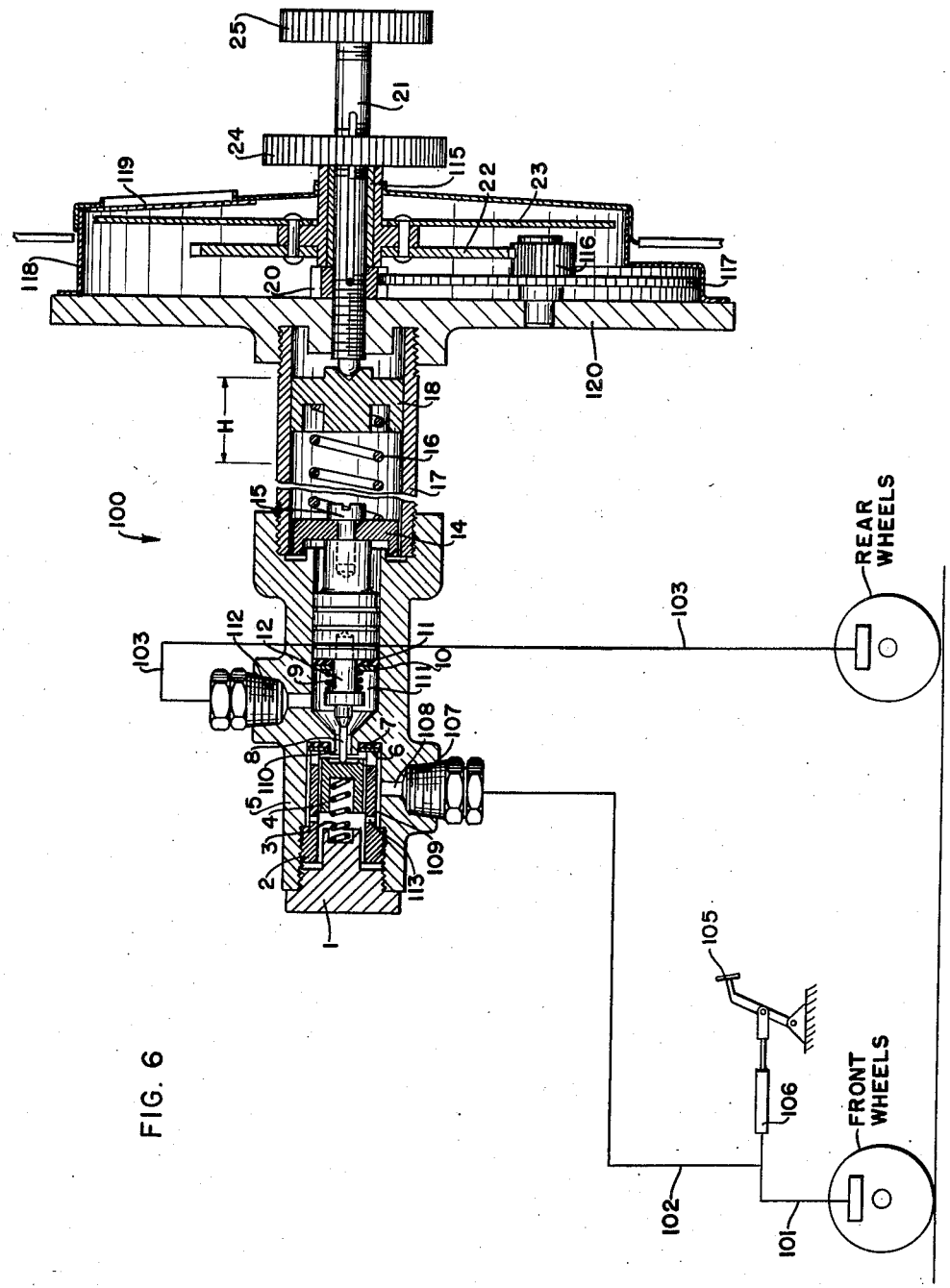
Figure 6 is a section of a control valve constructed according to my invention and illustrates the hook-up of the control valve in the hydraulic circuit.
Figure 9:
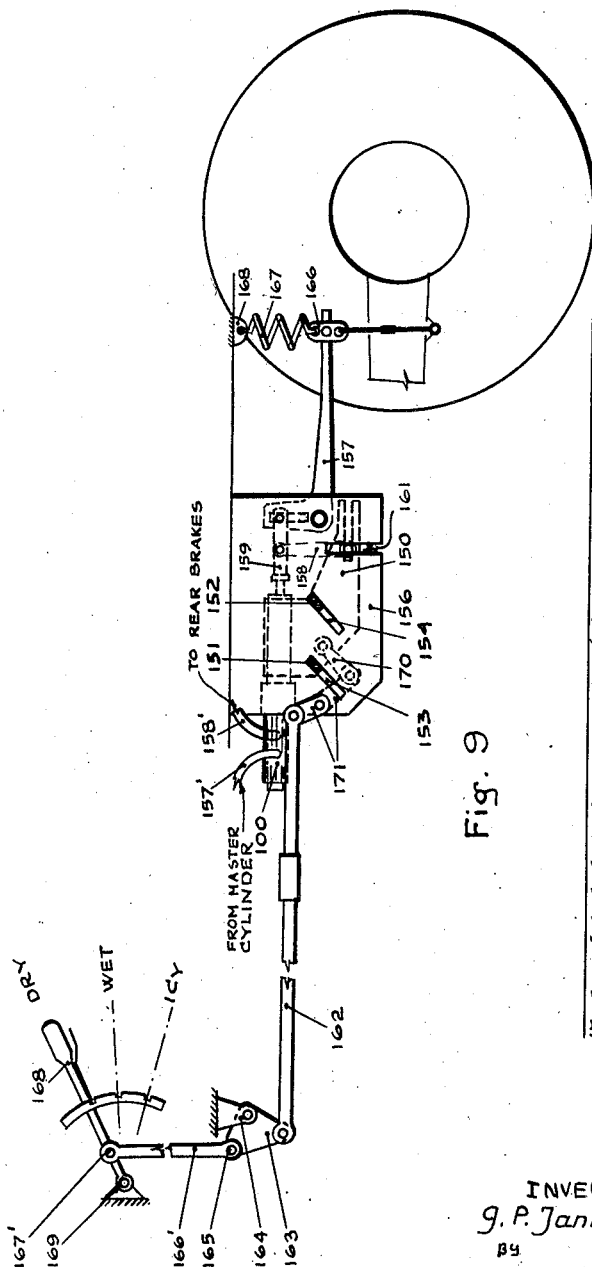
Figure 9 is partly a section through and partly a side view of an automatically operating anti-skid braking system.

Figures 4, 5 and 6 illustrates the method of correlating brake forces to car load and adhesion, which constitutes the subject matter of the present invention.

Figure 6 shows front wheels and rear wheels connected by hydraulic lines 101, 102, and 103. The brake pedal 105 is connected to a master cylinder 106 which is joined to the lines 101 and 102. A control valve 100 constituting one means of carrying out the subject matter of the present invention is inserted between the lines 102 and 103. As shown in Figure 6 and as will be described in greater detail hereinafter, the control valve 100 includes a spring 16.

Figure 4 shows the deflection of the spring 16 in relation to the braking oil pressure and the spring tension. It is apparent that the curve of this diagram is a straight line, deflections of the spring being plotted horizontally while the brake oil pressure which is equal to spring tension is plotted vertically.

Directly correlated to the curve of Figure 4 are the curves of Figure 5 which are plotted to the same scale and which compare the adhesion qualities of the road to the brake load required to stop the car at dynamic conditions. Horizontally are plotted the adhesion factors of the road while the braking force required to stop the car is plotted vertically. The two curves are for different car load conditions ranging from a no load car with only one driver to a full load car having the maximum number of passengers during full braking. Figure 5 illustrates dynamic full load and no load curves but, obviously, a curve for any other given load may be provided.

The following equation may be used to provide a curve of adhesion as a function of the braking force for each rear wheel:

$$R = \frac{A_x \cdot Q}{2}\left(n - \frac{S}{L}\right)$$

wherein R is the rear wheel braking force;

$A_x$ is the deceleration of the vehicle;

Q is the total car weight plus car load;

n is the percentage of the weight of the car acting on rear wheels only;

S is the distance from the weight center of the car to the road surface;

L is the distance between the front and rear wheels.

It must be remembered that the curves shown in Figures 3, 4 and 5 apply to one particular make of car only and that different sets of curves must be drawn for every model of every make of car since some of the factors in the above-stated equations vary with different car models.

As already stated, in accordance with the present invention a control valve 100 which is best shown in Figure 6 is installed directly in the instrument panel 120 of the automobile and is inserted in the oil lines 102 and 103 which operate the rear wheel brakes. The control valve 100 comprises a casing 5 carrying a front plug 1 which is screwed into the central opening of the casing. The oil line 102 is inserted into a threaded opening 107 communicating with a passage 108 which leads into an inner space 109. The space 109 is in communication through a narrower passage 110 with an enlarged passage 111. The passage 111 is in communication with a threaded opening 112 connected to the oil line 103. Thus it is apparent that the passages 107 to 112 are situated within the oil line providing a communication between the front wheel brakes and the rear wheel brakes.

A sleeve 2 is located within the chamber 109 between the plug 1 and a metal washer 6 which engages a hard rubber washer 7. The sleeve 2 is provided with pressure equalizing openings 113.

A check valve 4 slides back and forth within the sleeve 2 while the washer 7 serves as a saddle for the check valve 4. The sleeve 2 prevents the check valve 4 from pressing against the sides which might otherwise occur due to the dynamic side pressure developed by a stream of high pressure oil produced by sudden braking through the opening 108.

Due to the provision of the sleeve 2 the flow of oil is redirected, so as to avoid dynamic side pressure. The check valve 4 has equalizing channels grooved upon its outer surface to secure equal pressure.

The check valve 4 is kept open by a needle 8 and a spring 9. A washer 10 engages a rubber piston packing 11 and presses it against the cylinder walls to create an oil seal. The needle 8 is screwed to a piston 12 which is reciprocable in the space 111. The rear end of the piston 12 is connected by a bolt 15 with a cover member 14. The sleeve 17 has one end which is screwed into the end of the casing 5. A spring 16 is superposed between the member 14 and a piston 18 which is slidable in the sleeve 17. The spring 16 is attached to the end cover 14 of the piston 12.

The piston 18 is connected with a threaded rod 21 which extends through the board 120 and the outer end of which carries an adjustable knob 25. A fastening wheel 24 locks the knob 25 by means of sleeve 115 and a gear 20. The gear 20 meshes with a gear 117. The gear 117 is connected with a gear 116 meshing with a gear 22.

A dial 23 is firmly connected to the gear 22 and is located in a casing 118 attached to the board 120 and provided with a window 119.

The operation of the device is as follows:

High pressure oil flows from the master cylinder 106 through the opening 107 into the chamber 109, then through the central opening 110 into the chamber 111. From the chamber 111 oil flows through the oil line 103 to the rear wheel brakes.

When the operator steps on the brake pedal 105 the oil pumped from the master cylinder 106 builds up pressure as it enters the space 111.

As soon as oil pressure upon the rear brakes reaches the predetermined set pressure, the piston 12 will slide to the right, looking in the direction of Figure 6, and the needle 8 will release the check valve 4 so that the check valve under the influence of spring 3 will close the space 110 and thus interrupt the connection between the spaces 109 and 111. It is apparent that this will shut off the supply of oil from the master cylinder to the rear brakes and prevent overbraking.

As already stated, pressure of the spring 16 is determined by the operator, by setting the control knob 25. As a consequence of this predetermined pressure setting, spring 16 will permit piston 12 to move (to the right in Fig. 6) to permit check valve 4 to close whenever the oil pressure in chamber 111 reaches the corresponding level. Thus, at any given setting of knob 25, no matter what force is applied to pedal 105 only a predetermined maximum force can be applied to the rear wheel brakes.

When the operator releases the brake pedal 105 and as soon as the oil pressure in the space 109 drops below the pressure in the chamber 111, the check valve 4 will move to the left, due to the greater pressure in the chamber 111. The piston 12 will then move to its normal location for zero pressure and the needle 8 will keep open the check valve 4. The spring 3 will engage the check valve 4 against the needle 8.

It is apparent that the check valve 4 shown in Figure 6 can be replaced by a cone-headed check valve sliding directly in the valve casing 5.

As already stated, the tension of the spring 16 is determined by setting on the dial 23. The operator by turning the adjusting knob 25 to a setting selected in accordance with the indications of the dial 23 actuates the gears 20, 117, 116 and 22. Then the dial is moved in accordance with the deflections of the spring 16. The spring deflection H in Figure 6 is proportional to the dial movement H in Figure 7.

Figure 7:
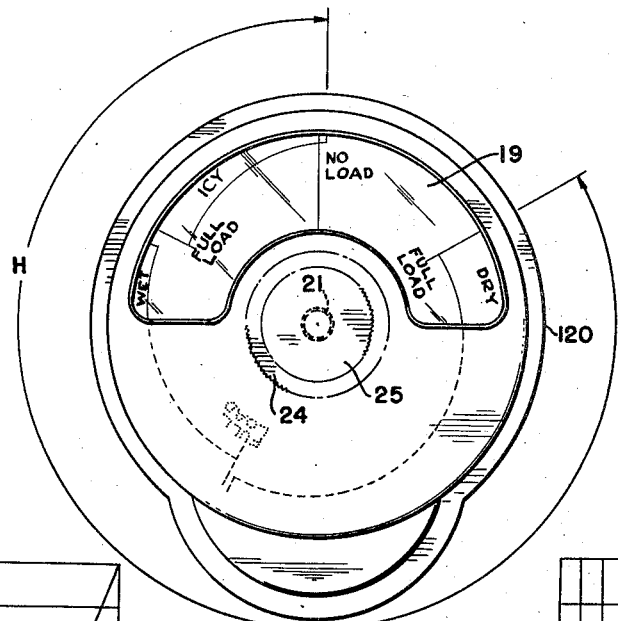
Figure 7 is a front view of the device shown in Figure 6.

As shown in Figure 7 the dial 23 is marked to show all conditions pertaining to car load as well as road conditions (related to friction or adhesion between the tires and the road).

By way of example, the setting appearing in Figure 7 shows that the car is being driven with no passengers on an icy road. As soon as road conditions change or the car is loaded with passengers or freight, the operator loosens the fastening wheel 24 and then adjusts the knob 25 so that the dial is moved to its proper position. Then the operator tightens the fastening wheel 24 to hold the device securely in the new position.

It is apparent that the final dial settings may be checked by using them under actual driving conditions so that the necessary corrections or adjustments can be made.

It is apparent that an anti-skid braking system of the described type will effectively prevent skidding due to the locking of the rear wheel brakes. As already stated, when the driver applies a large braking force the front wheel brakes may lock the front wheels. This locking of the front wheels will cause them to slide, but there will be no skidding since the rear wheel brakes will not lock and will deliver a full rolling adhesion response to the maximum braking force which the existing setting of knob 25 permits.

Practical experimentation has shown that this type of action will prevent skidding on all types of road surfaces, including slippery, icy surfaces. By way of example, should a driver, driving a car on a slippery or icy road, find that the car is beginning to skid due to excessive driving forces, he only needs to apply the brakes and by so doing cause the front wheels to lock. Due to the sliding of the locked front wheels, while the rear wheels are producing a rolling braking force, the car will straighten out on the road and skidding will be prevented.

It is also apparent that the described anti-skid braking system will prevent skidding when a car has to be braked as it is entering a curve on the road since the rolling braking force on the rear wheels and the locked front wheels will cause the car to travel along a straight line. This is a sign to the driver that the car is overbraked. Then the driver must reduce the pressure on the brake pedal and unlock the front wheel brakes. Then the car will develop its full rolling braking force and the driver will regain full control of the car.

Thus in this braking system overbraking will cause the car to travel along a straight line instead of spinning and this will indicate to the driver that the car is overbraked.

Figures 8 to 13 show an automatic anti-skid braking system wherein load conditions are adjusted automatically. The driver is merely required to make adjustments for road conditions.

This system includes the control valve 100 which is the same as the control valve shown in Figure 6 and which therefore is not illustrated in detail. The control valve 100 is located below the car body and is attached by means of the rear sleeve 17 with a support 150. The support 150 has projections 151 and 152 extending through grooves 153 and 154 which are formed in a bracket 156. A hose 157' is used to supply oil from a master cylinder to the control valve 100. Another hose 158' is used to provide a flexible connection between the control valve and the line to the rear brake cylinders.

The control valve 100 along with its support 150 slides in the bracket 156 between positions indicated by the letters $d$ and $d_1$ (Figure 10). The position $d$ is used for a dry road condition while the position $d_1$ is intended for an icy road condition.

In the example illustrated the shifting of the control valve 100 is effected by a crank lever 168'. Obviously, the same operations may be carried out by means of a servomotor or a device operated by push buttons.

The lever 157 will move between positions 1, 2, 3 and 4 for dry road conditions and positions $1_1$, $2_1$, $3_1$, $4_1$ pertaining to icy road conditions. It is apparent that the dry road conditions and icy road conditions correspond to the locations $d$ and $d_1$ of the valve support 150.

The shifting of the control valve 100 with its lever 157 is carried out by means of a swing-lever 158 one end of which is attached to a pusher 159. The pusher 159 carries a rod 160 which is connected to the piston 18 of the control valve 100.

The lower end of the lever 158 slides in a vertical slot 161 provided in the bracket 156. It is apparent that the up and down movement of the lower end of the swing lever 158 is transmitted to the pusher 159 of the control valve.

The bracket 150 along with a control valve 100 (Figure 9), are connected by a member 170, a swing lever 171 and a connecting rod 162 with a member 163 which is pivoted at 164 to the car body and which is connected by a pivot 165 with a rod 166', connected at 167' with a manually operated lever 168'. One end of the lever 168' is pivoted at 169 to the car frame.

It is apparent that the operator can shift the hand lever 168' to any one of a number of positions designated as "dry," "wet," or "icy." This movement of the lever 168' is transmitted in the described manner to the support 150 and the control valve 100 which will move between two end locations.

It is apparent that the lever 158 will have practically no influence upon the spring 16 of the control valve 100 so that the deflection of the spring will not be affected to any substantial extent.

As the control valve 100 shifts from a dry road position to an icy road position the control valve spring will have less tension due to the decreased static braking force on icy roads as compared to dry roads.

It is apparent that the tension of the spring is decreased by means of slots 153 and 154. By the use of the slots the end of the spring 16 moves from the position $a\ b$ for dry roads to the position $a_1\ b_1$ for icy roads. The spring elongation amounts to $a_1b_1 - ab = K$. Figure 10 shows the extreme positions for full load and dry road conditions. The static braking force is indicated in Figures 11 and 12 and is equal to $p$ for full load and dry road conditions. For full load and icy road conditions the static braking force equals $q$.

Therefore, during icy conditions the braking force $q$ will be smaller than the braking force $p$ for dry road conditions, and the spring 16 will then have the elongation $k$ shown in Figure 11. These conditions are determined by the inclination of the slots 153 and 154 in the bracket 156.

It is apparent that once the slope is determined it will satisfy not only full load at dry, wet or icy conditions but also any other load at any other condition, since static conditions are represented by straight lines in Figure 12 and dynamic conditions will influence the spring 16 automatically.

As shown in Figure 10 the lever 157 is connected by a member 166 with a main spring 167 which is attached at 168 to the car body.

By way of example, when the car is being braked at full load and dry road conditions, the main lever 157 automatically takes the position 0-3 shown in Figure 10. The spring 16 will be elongated and the braking force during the braking will decrease to $p_3$, corresponding to dynamic conditions, instead of being $p$ which is the static condition.

It is apparent that due to the automatic braking power adjustment the car will never start to skid and will have a shorter braking distance since, as already stated, the adhesion of a rolling wheel is greater than the adhesion of a sliding wheel.

It should be noted that in order to make the automatic anti-skid braking system installable in any make or model of automobile, the slots should be adjustable. This can be done by constructing the slides 154 and 153 as an adjustable parallelogram.

Also the main lever 157 can be of any suitable size or shape other than that shown on the drawing.

Adjustment can also be made by another method, namely, instead of relocating the control valve, the swinging point 0 of the main lever 157 can be made movable so that it can be shifted into a number of different positions.

It is apparent that the examples shown above have been given solely by way of illustration and not by way of limitation and that they are subject to many variations and modifications within the scope of the present invention. All these variations and modifications are to be included within the scope of the present invention.

What is claimed is:

1. In a fluid pressure braking system for a wheeled vehicle having a braked wheel on at least one front and one rear axle: fluid pressure braking motors for each braked wheel; a fluid pump; conduits for transmitting fluid under pressure from said pump to said motors; actuating means for operating said pump; and a pressure operated variable control valve assembly interposed in the conduit between said pump and the braking motor associated with each braked rear wheel, said valve assembly having a high pressure chamber connected to the conduit leading from said pump, a low pressure chamber connected to the conduit leading to the braking motor associated with each braked rear wheel, and pressure limiting means including a valve, a control member movable in response to and having only a single face exposed to the pressure in said low pressure chamber for seating and unseating said valve, and a regulable resilient loading means opposing the action of said control member on said valve; whereby the fluid pressure applied to a rear wheel motor is not affected by the rate of actuation of said actuating means and the maximum fluid pressure that can be applied to a rear wheel motor regardless of the force exerted by said actuating means will not exceed any selected one of a plurality of predetermined maxima.

2. In a hydraulic braking system of a wheeled vehicle having a braked wheel on at least one front and one rear axle: a wheel cylinder and a wheel piston in said wheel cylinder for each braked wheel; a master cylinder and a master piston in said master cylinder; brake lines connecting said master cylinder to said wheel cylinders; hydraulic fluid in said cylinders and lines; means for actuating said master piston; a pressure operated variable control valve assembly interposed in the brake lines from said master cylinder to the wheel cylinders associated with the rear braked wheels, said valve assembly having a high pressure chamber connected to the brake line leading from said master cylinder, a low pressure chamber connected to the brake lines leading to each cylinder associated with a braked rear wheel, and hydraulic pressure limiting means including a valve, a control member movable in response to, and having only a single face exposed to the pressure in said low pressure chamber for seating and unseating said valve, and a regulable resilient loading means opposing the action of said control member on said valve whereby the fluid pressure applied to said rear wheel cylinders is not affected by the rate of actuation of said master piston and the maximum fluid pressure that can be applied to said rear wheel cylinders regardless of the force exerted on said master piston will not exceed any selected one of a plurality of predetermined maxima; and means under the control of the vehicle operator while the vehicle is in motion for selecting said desired predetermined maxima.

3. A system according to claim 2 in which the hydraulic pressure limiting means includes a counter spring, a spring-loaded check valve biased to normally close off fluid flow from the master cylinder to the wheel cylinder, a plunger bearing on said check valve to hold said check valve open against the force of said spring loading, a control cylinder comprising the low pressure chamber, and a control piston slidable in said control cylinder, a single piston seal for effecting a liquid-tight seal between said control piston and said control cylinder, said control piston being positioned between said plunger and said counter spring to oppose the action of said counter spring on said plunger when said piston is subjected to fluid pressure in said control cylinder.

4. A system according to claim 3 in which the means under control of the vehicle operator includes movable stop means for adjusting the compression of the counter spring.

5. A system according to claim 4 including lever means responsive to vehicle load for adjusting the compression of the counter spring.

References Cited in the file of this patent

UNITED STATES PATENTS

| | | |
|---|---|---|
| 1,784,547 | Schmidt et al. | Dec. 9, 1930 |
| 2,218,194 | Freeman | Oct. 15, 1940 |
| 2,241,191 | Freeman | May 6, 1941 |
| 2,367,115 | Goepfrich | Jan. 9, 1945 |
| 2,479,232 | Gunderson | Aug. 16, 1949 |
| 2,490,641 | Du Rostu | Dec. 6, 1949 |
| 2,512,427 | Heller | June 20, 1950 |
| 2,657,774 | Perrot | Nov. 3, 1953 |

FOREIGN PATENTS

| | | |
|---|---|---|
| 444,955 | Great Britain | Mar. 30, 1936 |
| 471,716 | Great Britain | Sept. 9, 1937 |